(No Model.)
R. L. SAVAGE.
FRUIT PICKER.
No. 597,659. Patented Jan. 18, 1898.
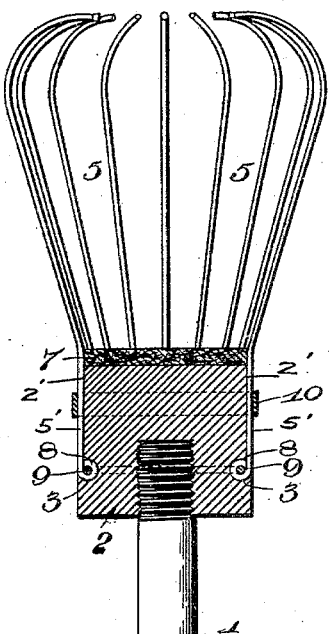
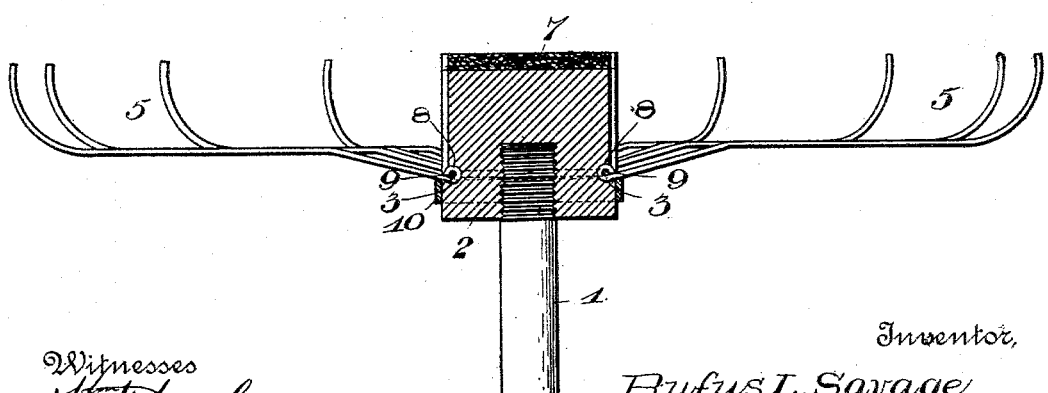
Witnesses
Inventor,
Rufus L. Savage,
By H. B. Willson
Attorney

UNITED STATES PATENT OFFICE.

RUFUS L. SAVAGE, OF ENOSBURG, VERMONT.

FRUIT-PICKER.

SPECIFICATION forming part of Letters Patent No. 597,659, dated January 18, 1898.

Application filed June 10, 1896. Serial No. 595,054. (No model.)

*To all whom it may concern:*

Be it known that I, RUFUS L. SAVAGE, a citizen of the United States, residing at Enosburg Centre, in the county of Franklin and State of Vermont, have invented certain new and useful Improvements in Fruit-Pickers; and I do declare the following to be a full, clear, and exact description of the invention, such as will enable others skilled in the art to which it appertains to make and use the same.

My invention has relation to improvements in fruit-pickers, and more particularly to that class of pickers for apples, pears, oranges, and similar tree-fruit; and the object is to provide a simple, cheap, and convenient device of this kind for gathering fruit; and to this end the novelty consists in the construction, combination, and arrangement of parts of the same, as will be hereinafter more fully described, and particularly pointed out in the claims.

In the accompanying drawings the same figures of reference indicate the same parts of the invention.

Figure 1 is a sectional side elevation of my improved fruit-picker. Fig. 2 is a similar view showing the picker open to discharge the fruit.

1 represents a handle, and 2 is a circular block detachably secured thereto, and its periphery is provided with a series of longitudinal parallel grooves 2', the lower ends of which terminate in the radial recesses 3, in which are located the eyes 8 of the spring-wire picker-fingers 5, arranged in a circle around said block, the shanks 5' of the fingers being secured in the longitudinal grooves 2' by a wire band 9. The free ends of the spring picker-fingers extend upwardly and are curved inwardly to leave an open space for the fruit to enter and form a cage to receive the gathered fruit.

7 is a cushion of any elastic material to break the force of the fall of the fruit as it is detached from the tree.

10 is a flat metal band which slides freely on the block to hold the spring-fingers in place while the device is used for picking, and when the cage formed by the series of picker-fingers is full of fruit the band 10 is slipped down to free the fingers and they open out, as shown in Fig. 2, to discharge the fruit.

The picker in operation is inserted over the fruit, so that the stem of the fruit will lie between two of the picker-fingers. A gentle downward pressure severs the fruit from the limb of the tree and it falls on the cushion 7. The picker is lowered and inverted and the fruit discharged in a suitable receptacle. This form of picker is primarily intended for delicate fruit, such as pears, peaches, apricots, and the like, which require to be picked singly and handled so as to prevent bruising; but the more hardy varieties may be picked one after another until the cage is full and then inverted and the band slipped down to free the fingers, allowing the full cage of fruit to be discharged at once.

Having thus fully described my invention, what I claim as new and useful, and desire to secure by Letters Patent of the United States, is—

1. The cylindrical block 2 formed with the recesses 3 in which are pivoted the lower ends of the spring-wire picker-fingers 5, in combination with the sliding band 10, substantially as and for the purpose set forth.

2. The cylindrical block 2 formed with the recesses 3, and provided with the elastic cushion 7, in combination with the spring-fingers 5, the eyes 8 of which are hinged in said recesses 3 by a wire band 9, and the sliding cylindrical band 10, adapted to hold the fingers in place, substantially as and for the purpose set forth.

In testimony whereof I hereunto affix my signature in presence of two witnesses.

RUFUS L. SAVAGE.

Witnesses:
W. H. MCALLISTER,
W. C. MCALLISTER.